United States Patent [19]

Priatko

[11] Patent Number: 4,791,630
[45] Date of Patent: Dec. 13, 1988

[54] METHOD AND APPARATUS FOR OPTICAL COMMUNICATION BY FREQUENCY MODULATION

[75] Inventor: Gordon J. Priatko, Oakland, Calif.

[73] Assignee: The United States of America as represented by the United States Department of Energy, Washington, D.C.

[21] Appl. No.: 911,710

[22] Filed: Sep. 26, 1986

[51] Int. Cl.$^4$ ............................................. H04B 91/00
[52] U.S. Cl. ........................................ 370/3; 455/617; 455/619
[58] Field of Search ................ 370/1, 3; 455/617, 619

[56] References Cited

U.S. PATENT DOCUMENTS 4,635,246  1/1987  Taylor et al. ........................ 455/617

FOREIGN PATENT DOCUMENTS 54-114005  5/1979  Japan ..................................... 455/617

OTHER PUBLICATIONS

Faure-Progress Towards Heterodyne-IEEE Jour. Quantum Electronics, vol. QE-17, #6, Jun. 1981, pp. 897-905.

Primary Examiner—Michael A. Masinick
Attorney, Agent, or Firm—P. Martin Simpson; Roger S. Gaither; Judson R. Hightower

[57] ABSTRACT

Laser optical communication according to this invention is carried out by producing multi-frequency laser beams having different frequencies, splitting one or more of these constituent beams into reference and signal beams, encoding information on the signal beams by frequency modulation and detecting the encoded information by heterodyne techniques. Much more information can be transmitted over optical paths according to the present invention than with the use of only one path as done previously.

8 Claims, 1 Drawing Sheet

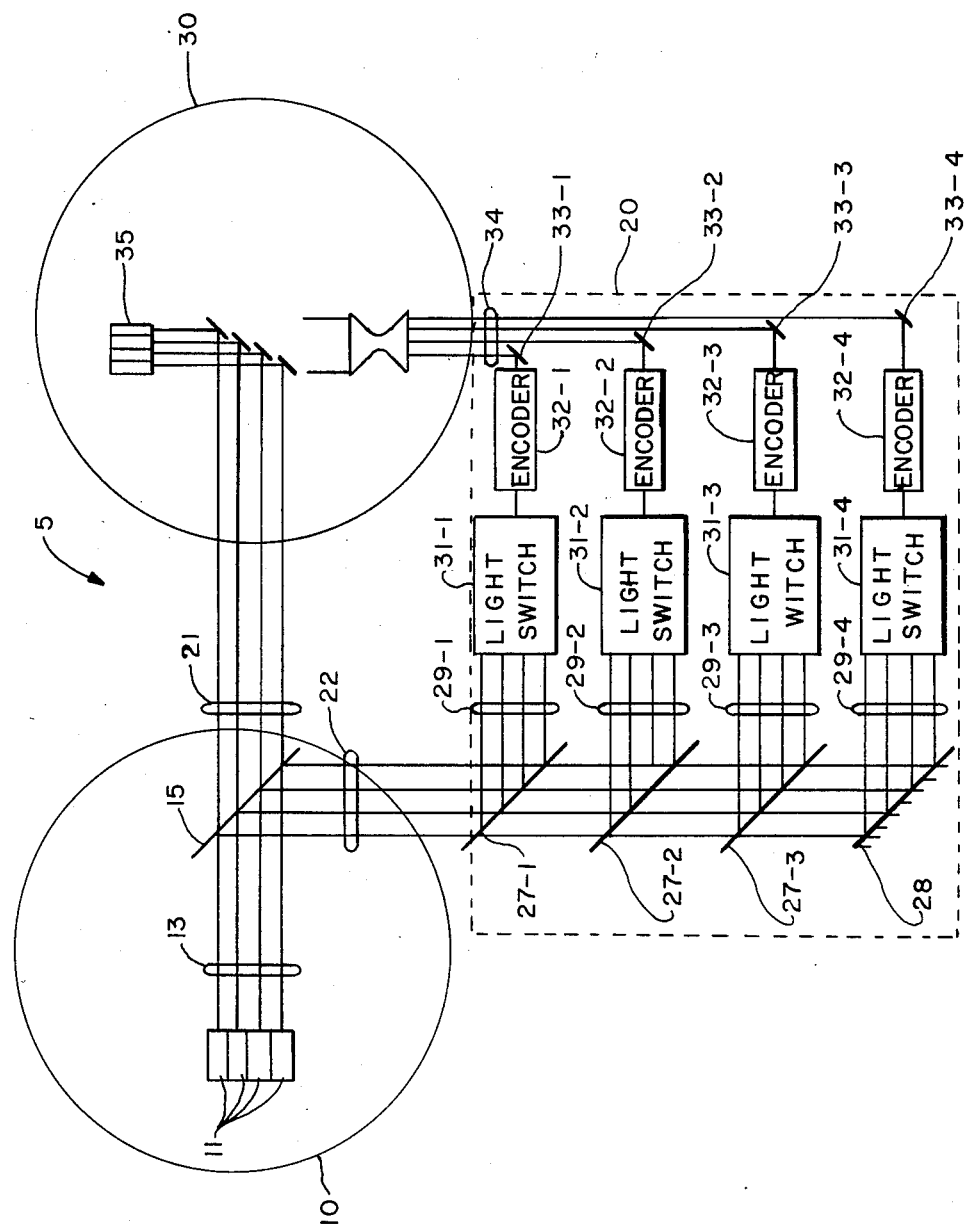

METHOD AND APPARATUS FOR OPTICAL COMMUNICATION BY FREQUENCY MODULATION

The United States Government has rights in this invention pursuant to Contract No. W-7405-ENG-48 between the U.S. Department of Energy and the University of California. The funding for this research came from Advanced Isotope Separation which comes from the Department of Energy through the Assistant Secretary for Nuclear Energy.

BACKGROUND OF THE INVENTION

This invention relates to a method and apparatus for using frequency modulated laser beams for optical communication and more particularly to a method and apparatus for such optical communication through cross-connected channels involving multiple laser frequencies.

The goal of optical communications is to exploit the extremely large bandwidth of the optical portion of the electromagnetic spectrum in ways analogous to traditional electrical communications. The overall performance of coherent optical communication systems, or the "Figure of Merit", is specified as the product of the amount of information transmitted per second and the distance of the transmission path. In order to improve the Figure of Merit from the current level on the order of 0.5 Terabit km/sec ($0.5 \times 10^{12}$ bits km/sec), it is necessary not only to improve the individual technologies in the various relevant fields, such as those related to transmitters and modulations techniques, but also to determine an optimum mixture of those technologies.

With respect to transmitters, laser diodes such as solid state laser diodes have been considered because they can be directly modulated faster than is currently possible with external cavity modulators. They can also provide peak optical power at wave lengths that correspond to minimums in the fiber optics' absorption profile, they can be mass-produced, and they require little support circuitry. On the other hand, however, there is a major drawback associated with laser diodes when they are modulated by amplitude shift keying (ASK) in that output light pulses vary both in intensity and in frequency. When a light pulse propagates down the fiber, the frequency components spread out at a rate that depends on both the modulation rate and the quality of the fiber. Future improvements in this technology are not expected to significantly reduce this problem.

With respect to the quality of optical fibers, the uniformity of the glass used in the fibers is approaching the practical economic limit as defined by the current technology. Neither is there expected a large improvement in total system performance due to improved fiber quality.

With respect to modulation techniques, ASK is not the only means for encoding data. Coherent optical signals can be made to interfere with each other in a way directly analogous to frequency modulated (FM) radio signals. One may thus modulate either the relative phase or the frequency of the optical signals (collectively referred to as "angle modulation", for which homodyne and heterodyne methods are available for detection). Although it is not practical to directly angle-modulate a laser beam, both these detection techniques have superior noise immunity relative to ASK.

When one considers optical communications, it is also necessary to take into account the scattering effects of coherent light in an optical fiber caused by the interaction of the light with an acoustic pressure wave generated within the fiber. Although the system performance can generally be improved by increasing the input optical power, it also has the effect of increasing the strength of the generated acoustic wave. The severity of the scattering, however, depends on the method used to modulate the input light signal. The use of angle modulation greatly suppresses the threshold for stimulated scattering as compared to when ASK modulation is used.

A further problem which should be considered relates to wavelength division multiplexing (WDM), which means the use of more than one light signal in an optical communications system, more particularly to the interaction of multiple optical signals within a fiber. When multiple optical signals are combined onto one fiber, stimulated Raman scattering can pump optical power out of the lower wavelength channels into higher wavelength channels as an example of "optical cross talk". The cross talk is present either with ASK or with angle modulation and represents a fundamental limitation on both the number of optical signals that can be combined onto a fiber and the optical power than can be contained in each signal.

SUMMARY OF THE INVENTION

In view of the above, it is an object of the present invention to improve the overall performance of laser optical communication.

It is another object of the present invention to provide an improved FM optical communication system.

It is a further object of the present invention to provide a multi-channel, optical communications system.

Described briefly, a multi-frequency laser beam containing a plurality of parallel constituent laser beams with mutually different frequencies is produced by using multiple laser sources. One or more of these parallel constituent beams are thereafter split into a reference beam and a signal beam. Signals are placed on the signal beam by encoder means and detected by the recombination of the reference and signal beams, i.e., by heterodyne techniques.

Additional objects, advantages and novel features of the present invention will be set forth in part in the description which follows, and in part will become apparent to those skilled in the art upon examination of the following, or may be learned by practice of the invention. The objects, features and advantages of the invention may be realized and attained by means of the instrumentalities and combinations particularly pointed out in the appended claims.

BRIEF DESCRIPTION OF THE DRAWING

The accompanying drawing, which is incorporated in and forms a part of the specification, is a diagram showing a laser optical communication system according to the present invention and, together with the following detailed description, serves to explain the principles of this invention.

DETAILED DESCRIPTION OF THE INVENTION

The accompanying drawing illustrates a laser optical communication system 5 incorporating the present invention. The system 5 essentially comprises a multi-frequency beam generator 10, a transmitter means 20 for transmitting information and a receiver means 30 for detecting transmitted information. One of the functions of the beam generator 10 is to provide multiple laser frequencies, or a laser beam containing a plurality (N-number) of individual well-collimated constituent laser beams which, having mutually different frequencies, propagate along a single path or along parallel paths in a comb-like manner as illustrated in the Figure. In the Figure, a system with N=4 is illustrated for the sake of simplicity, but a larger number on the order, for example, of $N=2^5=32$ is feasible for a practical system.

According to the embodiment of the present invention, illustrated with N=4 for convenience, the beam generator 10 makes use of four coherent light sources 11 disposed so as to generate mutually parallel beams 13 having different frequencies. These beams are then made incident onto a first beam splitter 15 of a known kind such as a pellicle and form transmitted beams 21 and reflected beams 22. For convenience, the transmitted beams 21 will hereafter be referred to as the reference beams and the reflected beams 22 likewise as the signal beams. Alternatively, reference beams can be generated at the receiving station. Unless specifically mentioned otherwise, it will be assumed hereinbelow (and as illustrated) that four constituent beams having four different frequencies are included both in the reference beams 21 and the signal beams 22.

The reference beams 21 are passed directly to the receiver means 30 but the signal beams 22 are rerouted to the transmitter means 20. For practical applications, the beam generator 10 and the receiver means 30 may be separated by a long distance on the order of kilometers. Likewise, the transmitter means 20 may be located much farther from the beam generator 10 and the receiver means 30 than indicated by the conceptual drawing in the Figure. Long distance transmission of the reference beams 21 and the signal beams 22 from the beam generator 20 to the receiver means 30 and to the transmitter means 20, respectively, may be achieved through optical fibers. In order to reduce the material cost in such a case, the beams 21 and 22 are preferably transmitted on a single path, or as a very narrow, multi-frequency beam by any method well known in the optical communication art.

In the transmitter means 20, the signal beams 22 are split into a plurality of channels. According to the embodiment of the present invention illustrated by the Figure, the signal beams 22 are split into four channels by means of an array of three signal beam splitters 27-1, 27-2 and 27-3 and a reflector 28, each channel containing four constituent beams having different frequencies. The total number of channels into which the signal beams 22 are split is not intended to limit the scope of the invention.

For each channel of beams 29-1, 29-2, 29-3 and 29-4 is a light switch means 31-1, 31-2, 31-3 or 31-4 which serves to selectively transmit one of the constituent beams in the channel with a specified frequency, while preventing beams with other frequencies from passing therethrough. The beam thus selected for its frequency is passed through an electro-optic modulator 32-1, 32-2, 32-3 or 32-4 associated with the channel.

The electro-optic modulator 32 serves to function as an encoder by effecting a frequency modulation on the beam which passes therethrough. The encoding is effected, for example, by phase shift keying. The frequency-modulated (encoded) beams from the eletro-optic modulators 32 are rerouted to the receiver means 30, for example, by means of four reflectors 33-1, 33-2, 33-3 and 33-4 as shown in the Figure to form a comb-like bundle of encoded multi-frequency beams 34. As explained above in connection with the transmission of reference and signal beams 21 and 22, the encoded beams 34 may be transmitted to the receiver means 30 through a glass fiber cable. Such method of transmission and apparatus used to form a narrow beam are very well known in the art and hence are not shown in the Figure which is intended merely to show the principles of the present invention.

The purpose of the receiver means 30 is to combine the reference beams 21 with the frequency-modulated beams 34 from the individual channels in the transmitter means 20 and to send them together to a plurality of detectors 35. The frequency difference between the corresponding constituent beams in the reference and signal beams 21 and 22 are detected by well-known heterodyne techniques.

The method and apparatus of the present invention are advantageous in that much more information can be transmitted over optical paths than by the conventional methods using fewer laser beams. Where one beam existed in the prior art, several are made available according to the present invention, each representing a channel of communication. In addition, the low noise advantage of heterodyne detection can be utilized by the present invention. Attempts have been made in the past at combining separate laser beams, but no combination of phase shift keying modulation and optical multiplexing is believed to have been proposed before.

The foregoing description of a preferred embodiment of the invention has been presented for purposes of illustration and description. It is not intended to be exhaustive or to limit the invention to the precise form disclosed, and obviously many modifications and variations are possible in light of the above teaching. For example, the number of beams is not intended to limit the scope of the invention. Re-routing of the signal beam need not be effected exactly in the way illustrated. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claim appended hereto.

What is claimed is:

1. A frequency-modulation (FM) optical communication system comprising
    beam generator means for producing multiple individually monochromatic laser beams of mutually differently frequencies,
    splitter means for splitting at least one of said individually monochromatic beams into reference and signal beams, and
    transmitter means for transmitting information from a first location to a second location, said transmitter means including
    selecting means each for variably selecting one of said signal beams, and
    encoder means for encoding information on those of said signal beams selected by said selecting means;
    said second location including receiver means for detecting said encoded information by heterodyne technique using said reference and signal beams.

2. The system of claim 1 wherein said beam generator means includes multiple laser sources.

3. The system of claim 1 wherein said transmitter means further include a plurality of transmitter beam splitters, said transmitter beam splitters serving to split said signal beams into channels and to transmit said signal beams through said channel individually to said selecting means.

4. The system of claim 3 wherein each of said channels includes one of said encoder means and one of said light switches.

5. The system of claim 4 wherein said encoder means serve to frequency-modulate said selectably transmitted signal beams through phase shift keying.

6. The system of claim 4 wherein said encoder means are electro-optic modulators.

7. A method of laser optical communication comprising the steps of producing multiple individually monochromatic laser beams of mutually different frequencies, splitting at least one of said beams into reference and signal beams, variably selecting one of said signal beams having selected one of said frequencies, encoding information on said selected one of said signal beams by frequency modulation, and detecting said information by combining said reference and encoded signal beams.

8. The method of claim 7 further comprising the step of splitting said signal beams into a plurality of channels, each of said channels being each provided with one of said variably selecting means which transmits selected one of said signal beams and encoder means for encoding information on said selected one of said signal beams.

* * * * *